Patented Dec. 10, 1929

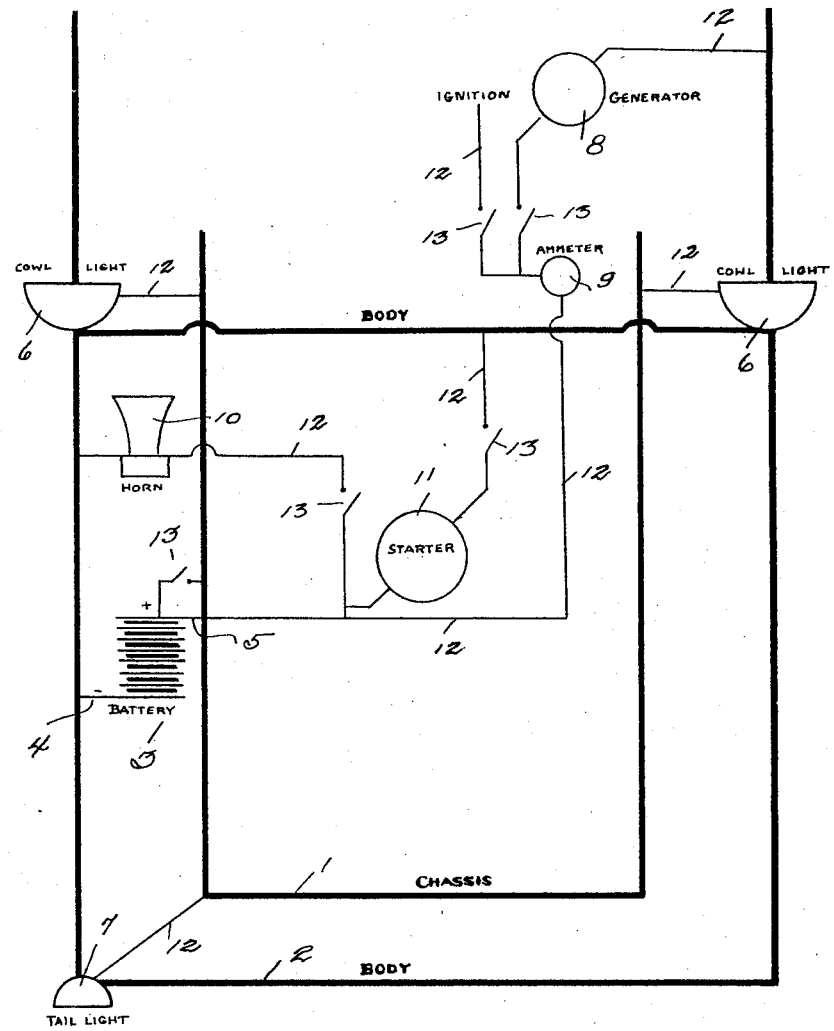

1,738,889

UNITED STATES PATENT OFFICE

MAX H. GOLDSTEIN, OF CHICAGO, ILLINOIS

MEANS OF CONDUCTING ELECTRICITY FOR MOTOR VEHICLES

Application filed January 28, 1928. Serial No. 250,254.

My present invention, in its broad aspect, has reference to improvements in means and methods of conducting electricity to energize the several electrical units of a motor vehicle, and more particularly it is my purpose to eliminate, as far as possible, the use of wires and the like. To this end I insulate the body of a motor vehicle from the chassis, suitable insulating material, such as soft rubber pads, or the like, being placed between the parts of the body and the parts of the chassis which ordinarily contact. I then use the frame as a conductor for positive electrical charges and the body as a conductor for negative electrical charges and vice versa. In practice I connect the respective terminals of the usual storage battery to the body and to the chassis, and utilizing the body and chassis as conductors for the charge, I connect thereto the several electrical elements of the vehicle, such for instance as the generator, ignition, starter, lighting fixtures, horn, head and tail lights, and the like. By these means I greatly simplify the electrical equipment of a vehicle, and at the same time, the body being so supported on the chassis that there is an intervening element between each of the several parts which ordinarily contact some vibration is eliminated since the insulating material is preferably soft rubber.

Other and equally important objects and advantages will become apparent as the description of my method proceeds, but while I have in the present instance defined for the sake of illustration a method and apparatus of a certain specific form, it will be understood that I do not desire to limit myself except as may be indicated by the scope of the claims appended hereto and forming a part of this specification.

In the drawing, I have illustrated diagrammatically an embodiment of my invention.

In the drawing wherein like characters or reference are used to designate like or similar parts:—

The chassis (1) and body (2) of a motor vehicle are insulated from each other preferably by means of soft rubber pads (not shown), and the battery (3) has its respective terminals connected as at (4) and (5) with the body and chassis. The cowl lights (6), tail light (7), generator (8), ammeter (9), horn (10), starter (11) and ignition (not shown), are also in circuit with the battery (3) through short supplementary connections (12) and the body (1) and chassis (2), and switches (13) are provided where necessary in the system. If for any reason it is not desired to use the body and chassis of the vehicle for conductors, I provide an elongated bar which may be hung by insulated brackets or the like between the body and chassis, or within the body, and to this bar I connect the various electrical instruments, the ignition, starter, battery, et cetera. The bar may be of any suitable conducting metal, may be of any desired or convenient shape, and may be mounted in any suitable manner provided, of course, that it is electrically insulated from surrounding structure. The bar, under these circumstances, has the function of eliminating the intricate wiring of the vehicle. By these means it will therefore be seen that I have largely eliminated the usual motor vehicle wiring system, and that equipment can, according to my apparatus and method, be mounted on a vehicle with little trouble and expense, it being merely necessary to connect the respective poles of the several electrical units to the body and chassis, or to the bar as the case may be.

While in the foregoing there has been illustrated and described such combination and arrangement of elements as constitute the preferred embodiments of my invention, it is nevertheless desired to emphasize the fact that interpretation of the invention should only be conclusive when made in the light of the subjoined claims.

I claim:—

1. In a motor vehicle having a body, a plurality of electrical units, and a chassis, the body being insulated from the chassis, a source of electrical energy having its poles connected respectively to the body and to the chassis thereby to use said body and chassis as a conductor for electricity, and the several electrical units of the vehicle being connected to the body and chassis thereby to be in circuit with the source of electrical energy.

2. In a motor vehicle having a storage battery, a body, a plurality of electrical units to be energized by the storage battery, and a chassis, the body being completely insulated from the chassis, the storage battery having its respective poles connected respectively to the body and the chassis thereby to use said body and chassis as a conductor for electricity, and the several electrical units of the vehicle being connected to the body and the chassis by short connections thereby to be in circuit with the storage battery.

In testimony whereof I affix my signature hereunto.

MAX H. GOLDSTEIN.